(12) United States Patent
Han et al.

(10) Patent No.: US 12,035,073 B1
(45) Date of Patent: *Jul. 9, 2024

(54) MULTIPLE HOST MANAGEMENT OF VIDEOCONFERENCING SUB-MEETINGS

(71) Applicant: Zoom Video Communications, Inc., San Jose, CA (US)

(72) Inventors: Lin Han, Los Altos, CA (US); Nitasha Walia, Sunnyvale, CA (US)

(73) Assignee: Zoom Video Communications, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/143,741

(22) Filed: May 5, 2023

Related U.S. Application Data

(63) Continuation of application No. 17/724,538, filed on Apr. 20, 2022, which is a continuation of application No. 17/163,369, filed on Jan. 30, 2021, now Pat. No. 11,336,865.

(51) Int. Cl.
*H04N 7/15* (2006.01)
*H04L 12/18* (2006.01)

(52) U.S. Cl.
CPC ......... *H04N 7/152* (2013.01); *H04L 12/1822* (2013.01)

(58) Field of Classification Search
CPC .............................. H04N 7/152; H04L 12/1822
See application file for complete search history.

(56) References Cited

U.S. PATENT DOCUMENTS

| | | | |
|---|---|---|---|
| 8,917,847 B2 | 12/2014 | Mai et al. |
| 9,961,119 B2 | 5/2018 | Bader-Natal et al. |
| 10,104,025 B2 | 10/2018 | Beust |
| 11,336,865 B1 | 5/2022 | Han et al. |

(Continued)

OTHER PUBLICATIONS

Miller, "Webex Adds Breakout Sessions and Co-Host Role", UW-Madison Information Technology; https://it/wisc.edu/category/news/; (c) 2021 Board of Regent of the University of Wisconsin System, Sep. 23, 2020, 2 pages.

(Continued)

*Primary Examiner* — Amal S Zenati
(74) *Attorney, Agent, or Firm* — Kilpatrick Townsend & Stockton LLP

(57) ABSTRACT

One example system for multiple host management of videoconferencing sub-meetings includes a processor and at least one memory device. The processor establishes a main videoconferencing meeting and establishes a host of the main videoconferencing meeting. The host participates using a first host client device. The processor can receive a selection of a participant to be a co-host. The co-host participates in the main videoconferencing meeting from a second host client device. The processor receives a first sub-meeting control input from the second host client device, wherein the first sub-meeting control input identifies an action to perform with respect to a sub-meeting. The system generates a second sub-meeting control input based on the first sub-meeting control input, executes the second sub-meeting control input, and discards the first sub-meeting control input so that the sub-meeting command is associated with the main host.

20 Claims, 7 Drawing Sheets

(56) References Cited

U.S. PATENT DOCUMENTS

| | | | | |
|---|---|---|---|---|
| 2004/0028199 A1* | 2/2004 | Carlson | ................ | H04M 1/247 |
| | | | | 379/93.21 |
| 2014/0362165 A1 | 12/2014 | Ackerman et al. | | |
| 2015/0304607 A1* | 10/2015 | Bader-Natal | ........ | H04L 12/1813 |
| | | | | 348/14.08 |
| 2016/0073058 A1 | 3/2016 | Bader-Natal et al. | | |
| 2016/0088259 A1* | 3/2016 | Anderson | .............. | H04N 7/157 |
| | | | | 348/14.03 |

OTHER PUBLICATIONS

U.S. Appl. No. 17/163,369, "Non-Final Office Action", dated Oct. 6, 2021, 9 pages.

U.S. Appl. No. 17/163,369, "Notice of Allowance", dated Feb. 11, 2022, 6 pages.

U.S. Appl. No. 17/724,538, "Non-Final Office Action", dated Dec. 21, 2022, 6 pages.

U.S. Appl. No. 17/724,538, "Notice of Allowance", dated Feb. 10, 2023, 6 pages.

* cited by examiner

MULTIPLE HOST MANAGEMENT OF VIDEOCONFERENCING SUB-MEETINGS

CROSS-REFERENCE TO RELATED APPLICATION

This is a continuation of U.S. patent application Ser. No. 17/724,538 filed Apr. 20, 2022, which is a continuation of and claims priority to U.S. patent application Ser. No. 17/163,369 filed Jan. 30, 2021, the entire disclosure of both are incorporated herein by reference.

FIELD

The present application generally relates to videoconferences and more particularly relates to systems and methods for managing sub-meetings of a main videoconferencing meeting.

BACKGROUND

Videoconferencing has become a common way for people to meet as a group, but without being at the same physical location. Participants can be invited to a videoconference meeting, join from their personal computers or telephones, and are able to see and hear each other and converse largely as they would during an in-person group meeting or event. The advent of user-friendly videoconferencing software has enabled teams to work collaboratively despite being dispersed around the country or the world. It has also enabled families and friends to engage with each other in more meaningful ways, despite being physically distant from each other.

SUMMARY

Various examples are described for systems and methods for multiple host management of videoconferencing sub-meetings. One example system includes a processor and at least one memory device. The memory device includes instructions that are executable by the processor to cause the processor to establish a main videoconferencing meeting. The main videoconference meeting includes a plurality of participants. The instructions cause the processor to establish a host of the main videoconferencing meeting. The host participates in the main videoconferencing meeting from a first host client device. The instructions also cause the processor to receive a selection, in response to a host selection input at the first host client device, of a first participant of the plurality of participants to be a co-host. The first participant participates in the main videoconferencing meeting from a second host client device. The instructions also cause the processor to receive a first sub-meeting control input from the second host client device, wherein the first sub-meeting control input identifies an action to perform with respect to a sub-meeting associated with the main videoconferencing meeting. The instructions also cause the processor to generate a second sub-meeting control input associated with the host, wherein the second sub-meeting control input is based on the first sub-meeting control input, and cause the processor to execute the second sub-meeting control input, and to discard the first sub-meeting control input.

One example method includes establishing a main videoconferencing meeting, the main videoconference meeting including a plurality of participants, and establishing a host of the main videoconferencing meeting, the host participating in the main videoconferencing meeting from a first host client device. The example method further includes receiving a selection, in response to a host selection input at the first host client device, of a first participant of the plurality of participants to be a co-host, the first participant participating in the main videoconferencing meeting from a second host client device, and receiving a first sub-meeting control input from the second host client device, the first sub-meeting control input identifying an action to perform with respect to a sub-meeting associated with the main videoconferencing meeting. The example method further includes generating a second sub-meeting control input associated with the host, wherein the second sub-meeting control input is based on the first sub-meeting control input. The method also includes executing the second sub-meeting control input, and discarding the first sub-meeting control input.

One example non-transitory computer-readable medium includes code that is executable by a processor for causing the processor to establish a main videoconferencing meeting. The main videoconferencing meeting includes a plurality of participants. The code also causes the processor to establish a host of the main videoconferencing meeting. The host participates in the main videoconferencing meeting from a first host client device. The code also causes the processor to receive a selection, in response to a host selection input at the first host client device, of a first participant of the plurality of participants to be a co-host. The first participant participates in the main videoconferencing meeting from a second host client device. The code also causes the processor to receive a first sub-meeting control input from the second host client device, wherein the first sub-meeting control input identifies an action to perform with respect to a sub-meeting associated with the main videoconferencing meeting. The code also causes the processor to generate a second sub-meeting control input associated with the host, wherein the second sub-meeting control input is based on the first sub-meeting control input. The code also causes the processor to execute the second sub-meeting control input, and to discard the first sub-meeting control input.

These illustrative examples are mentioned not to limit or define the scope of this disclosure, but rather to provide examples to aid understanding thereof. Illustrative examples are discussed in the Detailed Description, which provides further description. Advantages offered by various examples may be further understood by examining this specification.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Figure 1:
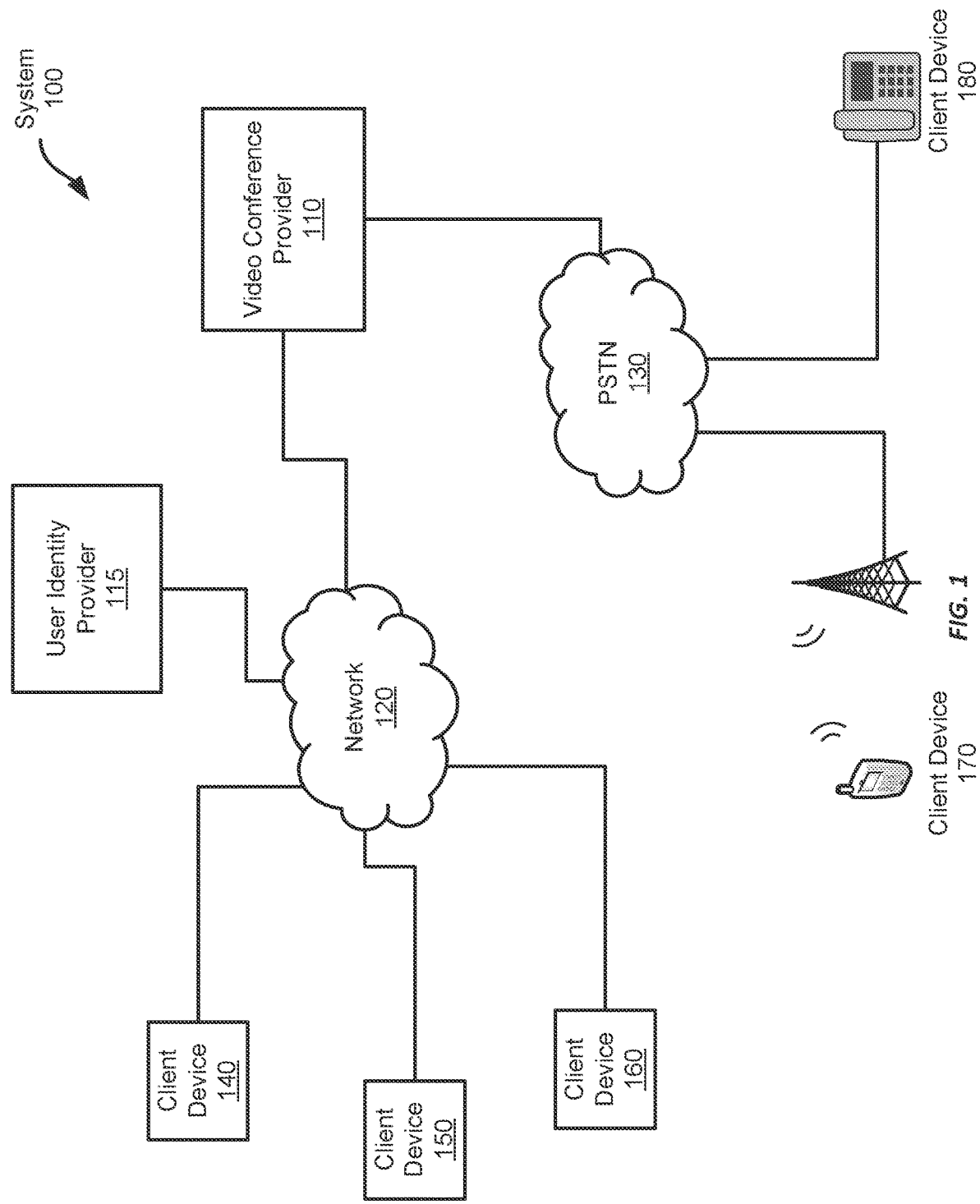
FIGS. 1-4 illustrate example systems to enable multiple host management of videoconferencing sub-meetings.

Examples are described herein in the context of systems and methods for managing videoconferencing sub-meetings. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Videoconferencing systems enable their users to create and attend videoconferences (or "meetings") via various types of client devices. After joining a meeting, the participants receive audio and video streams or feeds (or "multimedia" streams or feeds) from the other participants and are presented with views of the video feeds from one or more of the other participants and audio from the audio feeds. Using these different modalities, the participants can see and hear each other, engage more deeply, and generally have a richer experience despite not being physically in the same space.

To create a meeting, a person (referred to as the "host" or "meeting host") accesses the videoconferencing system, creates a new meeting, and identifies one or more other people to invite to the meeting. In response to the host creating the meeting, the videoconference system establishes the meeting by creating a meeting identifier and, if desired, a passcode or other access control information. The host can then send the meeting identifier (and access control information) to each of the invitees, such as by email. Once the meeting is started, the invitees can then access and join the meeting using the meeting identifier and any provided access control information. The initial, or main host can, in some systems, make another participant a co-host. The co-host can perform some functions to assist the host, but the main host centrally controls and manages other functions. This centralized control and management typically includes managing sub-meetings, sometimes referred to as "breakout rooms."

Providing a central point of control for managing sub-meetings prevents conflicts between participants who may issue sub-meeting commands at the same time, or nearly the same time. Sub-meeting commands may include commands to start a sub-meeting, move participants into a sub-meeting, move participants out of a sub-meeting, or end the sub-meeting. Conflicts between users issuing such commands can result in race conditions or undesired results depending on which commands take precedence. However, the central point of control can also be inconvenient from a user's perspective. For example, in an educational environment, it may be desirable for a teacher and a teaching assistant to each have the ability to manage breakout rooms. In a corporate environment, it may be desirable to manage breakout rooms related to a large all-hands meeting. In such environments, it can be inconvenient for the main host to remain attentive to the meeting, while also managing sub-meetings without being able to at times rely on a cohost for assistance.

To provide more versatility and convenience in managing sub-meetings (breakout rooms) for a videoconferencing meeting, a videoconferencing system according to this disclosure enables multiple host management of videoconferencing sub-meetings. In one example, once a main videoconferencing meeting is established, the main host can select one or more co-hosts. Commands corresponding to control inputs, such as to assign meeting participants to breakout rooms, received by the videoconferencing system from the main host's client device are stored in a command queue associated with the main host. Co-hosts may be selected by the main host from among participants in the main videoconferencing meeting. Each of the main host and the co-host(s) interacts with system using an associated client device. Sub-meeting control inputs received by the videoconferencing system from the main host's client device result in sub-meeting commands stored in the main host's command queue in the same manner as other control inputs.

When the system receives a sub-meeting control input from a co-host, the videoconferencing system treats the associated commands as originating from the main host's client device. The videoconferencing system generates a sub-meeting control input associated with the main host's client device based on the co-host's control input to identify the same command with respect to managing the sub-meetings. This second sub-meeting control input is placed into the host's command queue and executed, invoking the command as though the main host had initiated the command. The sub-meeting control input from the co-host is discarded.

When multiple co-host inputs are received at the same time or about the same time by the videoconferencing system servers, the actions specified need to be prioritized to prevent a race condition. For example, if two co-hosts or a host and co-host each assign the same participant to a different sub-meeting at the same time, undesirable response can occur, such as the participant rapidly changing between multiple different rooms in succession. Thus, a prioritization scheme can address these issues and reduce or eliminate such undesirable behavior. For example, a stored prioritization can, as an example, specify that the most recent control input received at the video conference provider is always executed. Such a prioritization eliminates the need to account for varying network conditions and delays between the co-hosts to determine which input was made first. As an alternative, or in addition, a main host can be given priority over a co-host, or priority can be based on any other differences between the client devices or their users.

The techniques disclosed herein for multiple host management of sub-meetings provide convenience to users, since a single host for a large virtual gathering can obtain assistance from another participant in managing sub-meetings and can more easily attend to other aspects of the large gathering as needed. By treating control inputs of co-hosts as if they have been issued by the main host the videoconferencing system internally maintains a centralized point of control, eliminating race conditions and providing predictability in operation. Stored prioritization rules resolve conflicts between control inputs made by co-hosts and/or the host to resolve conflicts and improve efficiency.

This illustrative example is given to introduce the reader to the general subject matter discussed herein and the disclosure is not limited to this example. The following sections describe various additional non-limiting examples and examples of systems and methods for multiple host management of sub-meetings.

Referring now to FIG. 1, FIG. 1 shows an example system 100 that provides videoconferencing functionality to various client devices. The system 100 includes a video conference provider 110 that is connected to multiple communication networks 120, 130, through which various client devices 140-180 can participate in videoconferences hosted by the video conference provider 110. For example, the video conference provider 110 can be located within a private network to provide videoconferencing services to devices within the private network, or it can be connected to a public network, e.g., the internet, so it may be accessed by anyone. Some examples may even provide a hybrid model in which a video conference provider 110 may supply components to enable a private organization to host private internal videoconferences or to connect its system to the video conference provider 110 over a public network.

The system optionally also includes one or more user identity providers, e.g., user identity provider 115, which can provide user identity services to users of the client devices 140-160 and may authenticate user identities of one or more users to the video conference provider 110. In this example, the user identity provider 115 is operated by a different entity than the video conference provider 110, though in some examples, they may be the same entity.

Figure 2:
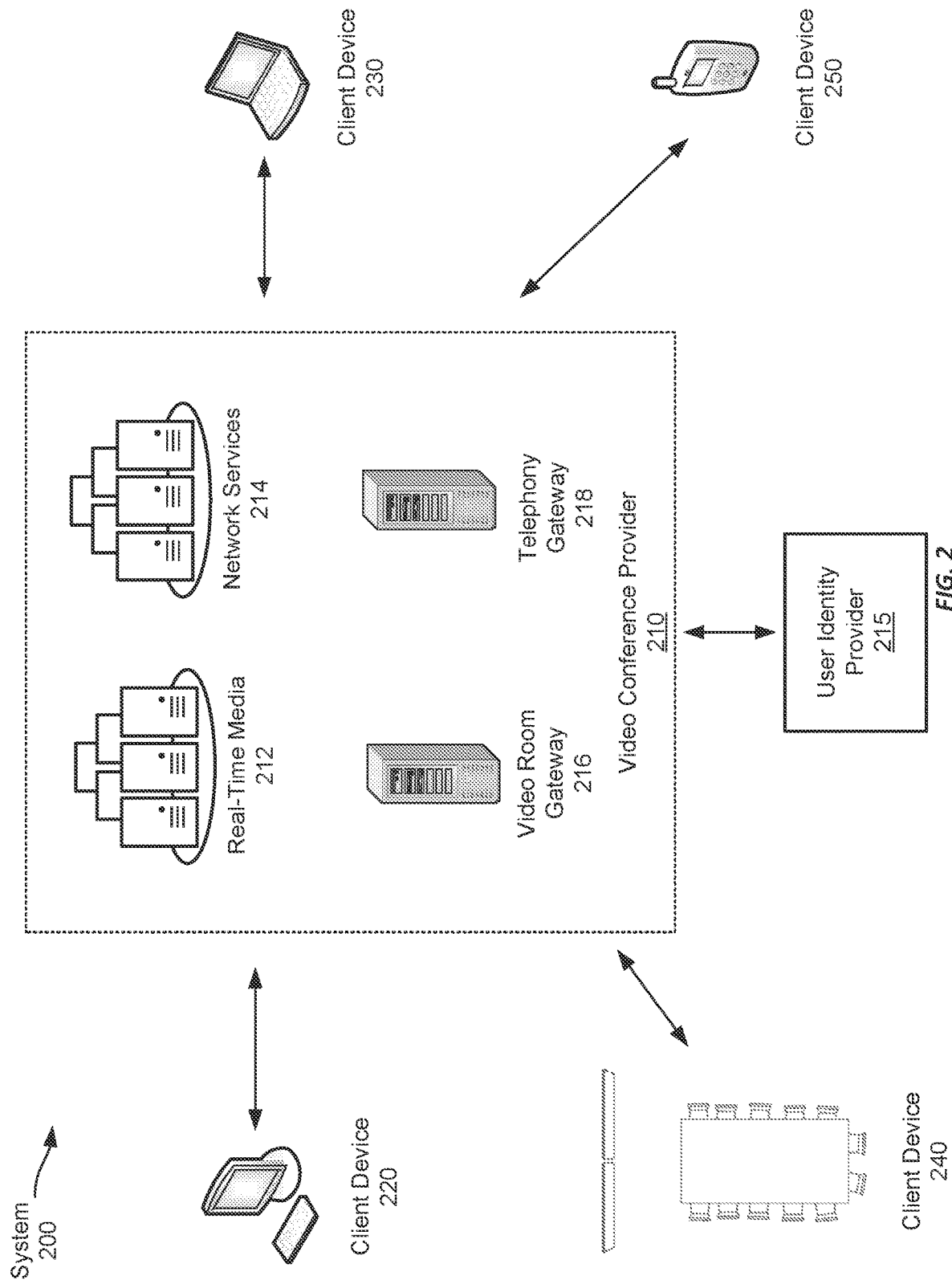

Video conference provider 110 allows clients to create videoconference meetings (or "meetings") and invite others to participate in those meetings as well as perform other related functionality, such as recording the meetings, generating transcripts from meeting audio, manage user functionality in the meetings, enable text messaging during the meetings, create and manage breakout rooms from the main meeting, etc. FIG. 2, described below, provides a more detailed description of the architecture and functionality of the video conference provider 110.

To create a meeting with the video conference provider 110, a user may contact the video conference provider 110 using a client device 140-180 and select an option to create a new meeting. Such an option may be provided in a webpage accessed by a client device 140-160 or client application executed by a client device 140-160. For telephony devices, the user may be presented with an audio menu that they may navigate by pressing numeric buttons on their telephony device. To create the meeting, the video conference provider 110 may prompt the user for certain information, such as a date, time, and duration for the meeting, a number of participants, a type of encryption to use, whether the meeting is confidential or open to the public, etc. After receiving the various meeting settings, the video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The videoconference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating the that meeting has not yet started or the host may be required to specifically admit one or more of the users.

During the meeting, the participants may employ their client devices 140-180 to capture audio or video information and stream that information to the video conference provider 110. They also receive audio or video information from the video conference provider 210, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting and they will no longer receive audio or video streams for the meeting (and will stop transmitting audio or video streams). The video conference provider 110 may also invalidate the meeting information, such as the meeting identifier or password/passcode.

To provide such functionality, one or more client devices 140-180 may communicate with the video conference provider 110 using one or more communication networks, such as network 120 or the public switched telephone network ("PSTN") 130. The client devices 140-180 may be any suitable computing or communications device that have audio or video capability. For example, client devices 140-160 may be conventional computing devices, such as desktop or laptop computers having processors and computer-readable media, connected to the video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated videoconferencing equipment. Each of these devices may provide both audio and video capabilities and may enable one or more users to participate in a videoconference meeting hosted by the video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can making conventional telephone calls and is not limited solely to dedicated telephony devices like conventional telephones.

Referring again to client devices 140-160, these devices 140-160 contact the video conference provider 110 using network 120 and may provide information to the video conference provider 110 to access functionality provided by the video conference provider 110, such as access to create new meetings or join existing meetings. To do so, the client devices 140-160 may provide user identification information, meeting identifiers, meeting passwords or passcodes, etc. In examples that employ a user identity provider 115, a client device, e.g., client devices 140-160, may operate in conjunction with a user identity provider 115 to provide user identification information or other user information to the video conference provider 110.

A user identity provider 115 may be any entity trusted by the video conference provider 110 that can help identify a user to the video conference provider 110. For example, a trusted entity may be a server operated by a business or other organization and with whom the user has established their identity, such as an employer or trusted third-party. The user may sign into the user identity provider 115, such as by providing a username and password, to access their identity at the user identity provider 115. The identity, in this sense, is information established and maintained at the user identity provider 115 that can be used to identify a particular user, irrespective of the client device they may be using. An example of an identity may be an email account established at the user identity provider 115 by the user and secured by a password or additional security features, such as biometric authentication, two-factor authentication, etc. However, identities may be distinct from functionality such as email. For example, a health care provider may establish identities for its patients. And while such identities may have associated email accounts, the identity is distinct from those email accounts. Thus, a user's "identity" relates to a secure, verified set of information that is tied to a particular user and should be accessible only by that user. By accessing the identity, the associated user may then verify themselves to other computing devices or services, such as the video conference provider 110.

When the user accesses the video conference provider 110 using a client device, the video conference provider 110 communicates with the user identity provider 115 using information provided by the user to verify the user's identity. For example, the user may provide a username or cryptographic signature associated with a user identity provider 115. The user identity provider 115 then either confirms the user's identity or denies the request. Based on this response, the video conference provider 110 either provides or denies access to its services, respectively.

For telephony devices, e.g., client devices 170-180, the user may place a telephone call to the video conference provider 110 to access videoconference services. After the call is answered, the user may provide information regarding a videoconference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the video conference provider 110. For example, telephony devices may be unable to provide user identification information to identify the telephony device or the user to the video conference provider 110. Thus, the video conference provider 110 may provide more limited functionality to such telephony devices. For example, the user may be permitted to join a meeting after providing meeting information, e.g., a meeting identifier and passcode, but they may be identified only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide user identification information to the video conference provider 110, even in cases where the user has an authenticated identity and employs a client device capable of identifying the user to the video conference provider 110. The video conference provider 110 may determine whether to allow such anonymous users to use services provided by the video conference provider 110. Anonymous users, regardless of the reason for anonymity, may be restricted as discussed above with respect to users employing telephony devices, and in some cases may be prevented from accessing certain meetings or other services, or may be entirely prevented from accessing the video conference provider.

Referring again to video conference provider 110, in some examples, it may allow client devices 140-160 to encrypt their respective video and audio streams to help improve privacy in their meetings. Encryption may be provided between the client devices 140-160 and the video conference provider 110 or it may be provided in an end-to-end configuration where multimedia streams transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the video conference provider 110, while allowing the video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the video conference provider 110. Further, such a system enables users to use a wide variety of different client devices 140-180 from traditional standards-based videoconferencing hardware to dedicated videoconferencing equipment to laptop or desktop computers to handheld devices to legacy telephony devices, etc.

Referring now to FIG. 2, FIG. 2 shows an example system 200 in which a video conference provider 210 provides videoconferencing functionality to various client devices 220-250. The client devices 220-250 include two conventional computing devices 220-230, dedicated equipment for a videoconference room 240, and a telephony device 250. Each client device 220-250 communicates with the video conference provider 210 over a communications network, such as the internet for client devices 220-240 or the PSTN for client device 250, generally as described above with respect to FIG. 1. The video conference provider 210 is also in communication with one or more user identity providers 215, which can authenticate various users to the video conference provider 210 generally as described above with respect to FIG. 1.

In this example, the video conference provider 210 employs multiple different servers (or groups of servers) to provide different aspects of videoconference functionality, thereby enabling the various client devices to create and participate in videoconference meetings. The video conference provider 210 uses one or more real-time media servers 212, one or more network services servers 214, one or more video room gateways 216, and one or more telephony gateways 218. Each of these servers 212-218 is connected to one or more communications networks to enable them to collectively provide access to and participation in one or more videoconference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed stream to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the videoconference system 210. In some such examples, the real-time media servers 212 may decrypt incoming multimedia streams, multiplex the multimedia streams appropriately for the various clients, and encrypt the multiplexed streams for transmission.

As mentioned above with respect to FIG. 1, the video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the video conference provider 210 may allow a meeting participant to notify it of inappropriate behavior or content in a meeting. Such a notification may trigger the real-time media servers to 212 record a portion of the meeting for review by the video conference provider 210. Still other functionality may be implemented to take actions based on the decrypted multimedia streams at the video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the videoconference system 210 and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the video conference provider under a supervisory set of servers. When a client device 220-250 accesses the video conference provider 210, it will typically communicate with one or more network services servers 214 to access their account or to participate in a meeting.

When a client device 220-250 first contacts the video conference provider 210 in this example, it is routed to a network services server 214. The client device may then provide access credentials for a user, e.g., a username and password or single sign-on credentials, to gain authenticated access to the video conference provider 210. This process may involve the network services servers 214 contacting a user identity provider 215 to verify the provided credentials. Once the user's credentials have been accepted, the client device 214 may perform administrative functionality, like updating user account information, if the user has an identity with the video conference provider 210, or scheduling a new meeting, by interacting with the network services servers 214.

In some examples, users may access the video conference provider 210 anonymously. When communicating anonymously, a client device 220-250 may communicate with one or more network services servers 214 but only provide information to create or join a meeting, depending on what features the video conference provider allows for anonymous users. For example, an anonymous user may access the video conference provider using client 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, creating sub-meetings or "breakout" rooms, recording meetings, etc. Such functionality may be managed by the network services server(s) 214.

For example, if a host wishes to remove a user from a meeting, they may identify the user and issue a command through a user interface on their client device. The command may be sent to a network services server 214, which may then disconnect the identified user from the corresponding real-time media server 212. If the host wishes to create a breakout room for one or more meeting participants to join, such a command may also be handled by a network services server 214, which may create a new meeting record corresponding to the breakout room and then connect one or more meeting participants to the breakout room similarly to how it originally admitted the participants to the meeting itself.

In addition to creating and administering on-going meetings, the network services server(s) 214 may also be responsible for closing and tearing down meetings once they have completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the video conference provider, the network services server(s) 214 may provide additional functionality, such as by providing private meeting capabilities for organizations, special types of meetings (e.g., webinars), etc. Such functionality may be provided according to various examples of video conference providers according to this description.

Referring now to the video room gateway servers 216, these servers 216 provide an interface between dedicated videoconferencing hardware, such as may be used in dedicated videoconferencing rooms. Such videoconferencing hardware may include one or more cameras and microphones and a computing device designed to receive video and audio streams from each of the cameras and microphones and connect with the video conference provider 210. For example, the videoconferencing hardware may be provided by the video conference provider to one or more of its subscribers, which may provide access credentials to the videoconferencing hardware to use to connect to the video conference provider.

The video room gateway servers 216 provide specialized authentication and communication with the dedicated videoconferencing hardware that may not be available to other client devices 220-230, 250. For example, the videoconferencing hardware may register with the video conference provider when it is first installed and the video room gateway may authenticate the videoconferencing hardware using such registration as well as information provided to the video room gateway server(s) 216 when dedicated videoconferencing hardware connects to it, such as device ID information, subscriber information, hardware capabilities, hardware version information etc. Upon receiving such information and authenticating the dedicated videoconferencing hardware, the video room gateway server(s) 216 may interact with the network services servers 214 and real-time media servers 212 to allow the videoconferencing hardware to create or join meetings hosted by the video conference provider 210.

Referring now to the telephony gateway servers 218, these servers 218 enable and facilitate telephony devices' participation in meetings hosed by the video conference provider. Because telephony devices communicate using the PSTN and not using computer networking protocols, such as TCP/IP, the telephony gateway servers 218 act as an interface that converts between the PSTN and the networking system used by the video conference provider 210.

For example, if a user uses a telephony device to connect to a meeting, they may dial a phone number corresponding to one of the video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio signals to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server 218 is instead joined to the meeting on the telephony device's behalf.

After joining the meeting, the telephony gateway server 218 receives an audio stream from the telephony device and provides it to the corresponding real-time media server 212, and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

Figure 3:
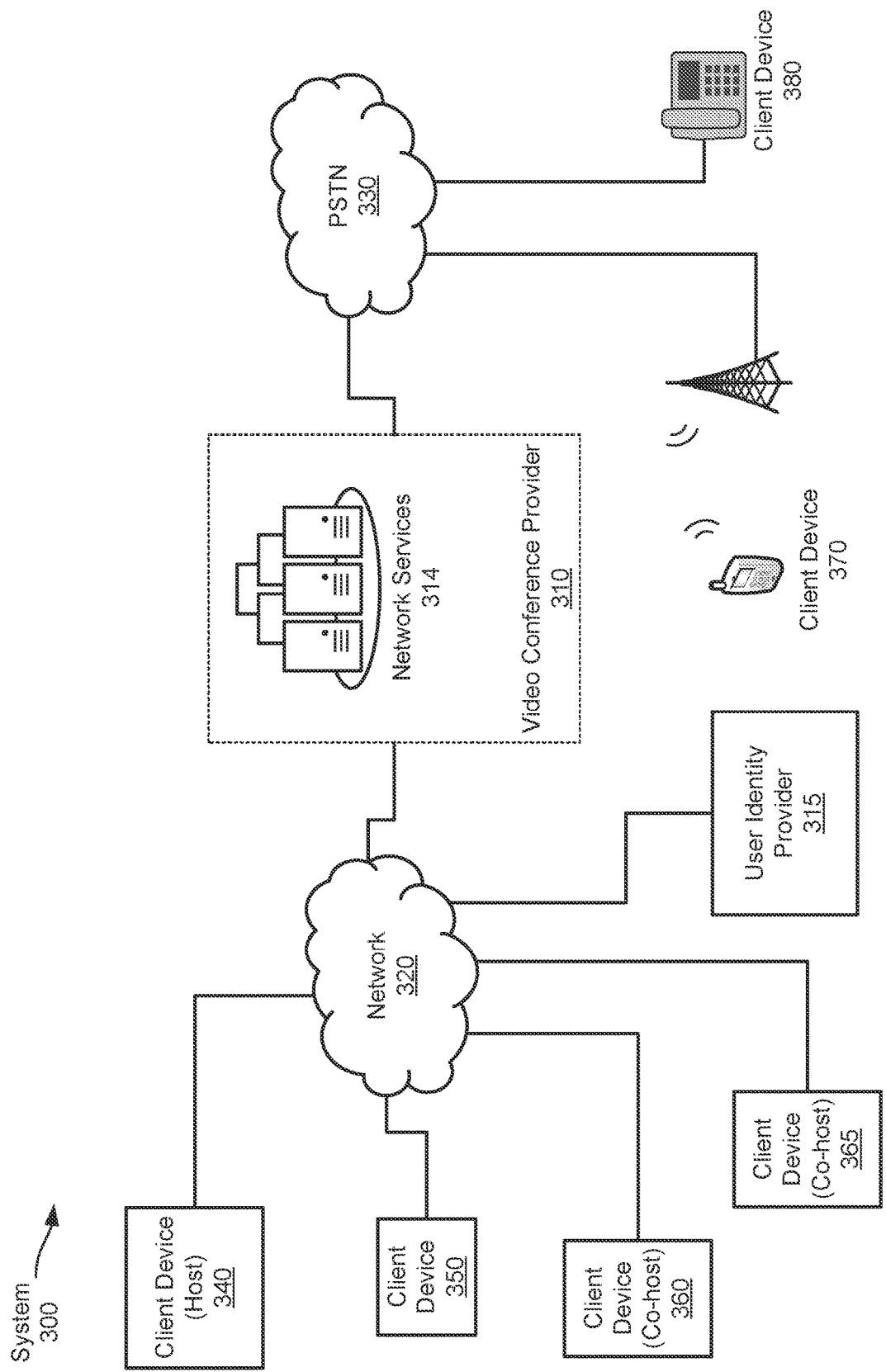

Referring now to FIG. 3, FIG. 3 illustrates an example system 300 for controlling sub-meetings (breakout rooms) using control input from multiple hosts, for example, a host and one or more co-hosts. FIG. 3 includes components similar to those shown in FIGS. 1 and 2. In this example, the system 300 includes a public user identity provider 315 through which individuals can establish identities that may be used to access various online services, including videoconference services provided by the video conference provider 310. In this example, when users attempt to access videoconferences hosted by the video conference provider 310, the video conference provider 310 attempts to verify each participant, such as by communicating with the user identity provider 315.

When a user establishes an identity with the user identity provider 315, they provide certain personal information, such as a name, address, birth date, email address(es), etc. The user identity provider 315 may then establish an identity for the user that provides certain functionality, such as an identity indicator (e.g., an account or user name), cryptographic signatures, etc., that the user may employ to access various online services. In some examples, the user may be able to connect to the video conference provider 310 and login into an account with the video conference provider 310 using the user identity provider 315 to access functionality provided by the video conference provider 310. However, in some examples, a participant or host of a videoconference may not have, or may not want, an account with the video conference provider 310.

To accommodate such unregistered users, the video conference provider 310 may require users to provide a user identifier, such as an identity established with the user identity provider, before admitting them to a videoconference or allowing them to create a videoconference. After receiving the user's identity and potentially additional information, such as cryptographic information, the network services server(s) 314 operated by the video conference provider 310 may communicate with the user identity provider 315 to verify that the identity is valid and to authenticate the user. After verifying the user's identity, the video conference provider 310 may then admit them to a scheduled meeting or allow them to host a scheduled meeting.

Using such a publicly available user identity provider may provide broader access to videoconferencing services without requiring individuals to register with the video conference provider. This may reduce the burden on the user, who may instead be able to use an existing identity.

Participants in a videoconferencing meeting taking place on system 300 use client devices 340-380 connected either using network 320 or PSTN 330. In this example, the participant using client device 340 is the host of a videoconferencing meeting. The host may be granted administrative privileges by the video conference provider 310 to allow client device 340 to manage meetings, such as by enabling or disabling screen sharing, muting or removing users from the meeting, creating sub-meetings or "breakout" rooms, recording meetings, etc. Such functionality may be managed by the network services server(s) 314 at the video conference provider 310. The participant using client device 360 and the participant using client device 365 have been selected as co-hosts of the videoconferencing meeting by the host providing host selection input using client device 340. Co-hosts, through their respective client devices, may be granted administrative privileges equal to the host by the video conference provider 310, or may have a subset of administrative privileges according to different examples, such as managing sub-meetings using their respective client devices.

Figure 4:
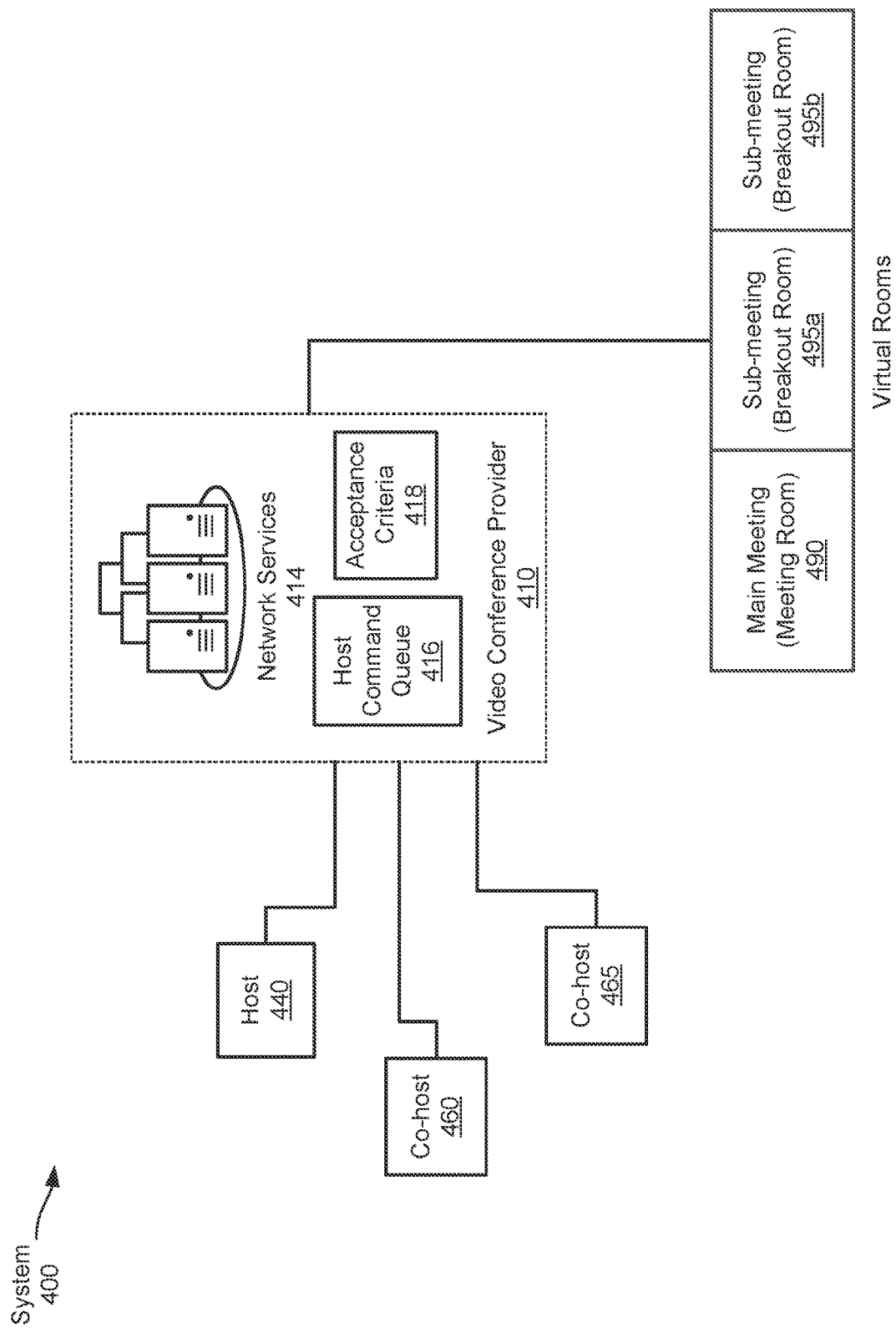

Referring to FIG. 4, FIG. 4 shows another example system 400 for controlling sub-meetings (breakout rooms) using control input from multiple hosts. For purposes of this description, the original host of the meeting may be referred to as a main host. The host(s) selected by the main host to share responsibility for hosting the meeting may be referred to as co-hosts. Alternatively, any of the above can be referred to simply as a "host" or a "co-host."

Example system 400 includes video conference provider 410 and network services server(s) 414. The host manages administrative settings using a host client device 440. Servers or other resources of the video conference provider 410 can include a command queue 416 of actions that have been requested or are being requested by host 440. These actions can include actions to perform with respect to sub-meetings associated with a main videoconferencing meeting, such as creating sub-meetings, moving meeting participants into or out of sub-meetings, and closing sub-meetings. Alternatively, the queue can be stored in the main host's client device and the video conference provider can interact with the command queue over network 320.

Resources of the video conference provider 410 can also include stored acceptance criteria 418. These criteria can include, as examples, whether a notification of a request to move a participant is sent to the participant, and whether the move is stopped if the participant does not accept, or does not accept within a certain amount of time. The notification can be transmitted selectively based on the criteria, that is, transmitted if specified, or omitted if not specified. If no notification is specified as part of the criteria, the action can be executed when the sub-meeting control input is received, taking into account any normal system delays. As an example, if the acceptance criteria require notification to the participant, the notification can take the form of a pop-up window presented on the client device of the participant that states that the host or co-host has invited the participant to the breakout room or back to the main room, as the case may be. The pop up window can also provide virtual buttons that can be selected by the participant to accept the invitation or to remain in place.

The main videoconferencing meeting 490 can be presented to users as a virtual meeting room with visual representations of some or all of the participants provided either by their respective video feed or an identifier, such as their name. Sub-meetings 495a-b can be presented to users as virtual breakout rooms similarly to how the main video conferencing meeting is presented. Each virtual room includes participants, the identities of which can be accessed and presented as a list in a user interface displayed by client devices with appropriate display capabilities. The experience of videoconferencing using virtual rooms thus substantially replicates the experience of holding a gathering in a main conference room in which participants divide into groups and meet in additional conference rooms or offices.

Example system 400 includes two co-host client devices, co-host client device 460 and co-host client device 465. Each co-host client device can accept sub-meeting control input. The main host 440 can also provide sub-meeting control input. Because videoconferencing systems like system 400 are typically designed around a single point of control in order to prevent conflicts and race conditions, sub-meeting associated commands in example system 400 issued by co-hosts can be converted to commands associated with the main host and inserted into host command queue 416. For example, a sub-meeting control input from a co-host using co-host client device 460 causes the generation of a second sub-meeting control input associated with host client device 440. The second sub-meeting control input for the relevant command is executed from queue 416 while the sub-meeting control input from the co-host is discarded.

Actions executed for sub-meeting control can include as examples, starting a sub-meeting, moving a participant into a sub-meeting, moving a participant out of a sub-meeting, muting participants in a sub-meeting, allowing or preventing screen-sharing by participants in a sub-meeting, recording a sub-meeting, or ending a sub-meeting. In one example, these actions also include moving a participant from a sub-meeting or breakout room into a main meeting room. Such a move can allow more convenient communication between hosts or co-hosts and another participant by allowing consultation to take place in the main meeting (main room) without having to shut down the breakout room where the participant was located.

Figure 5:
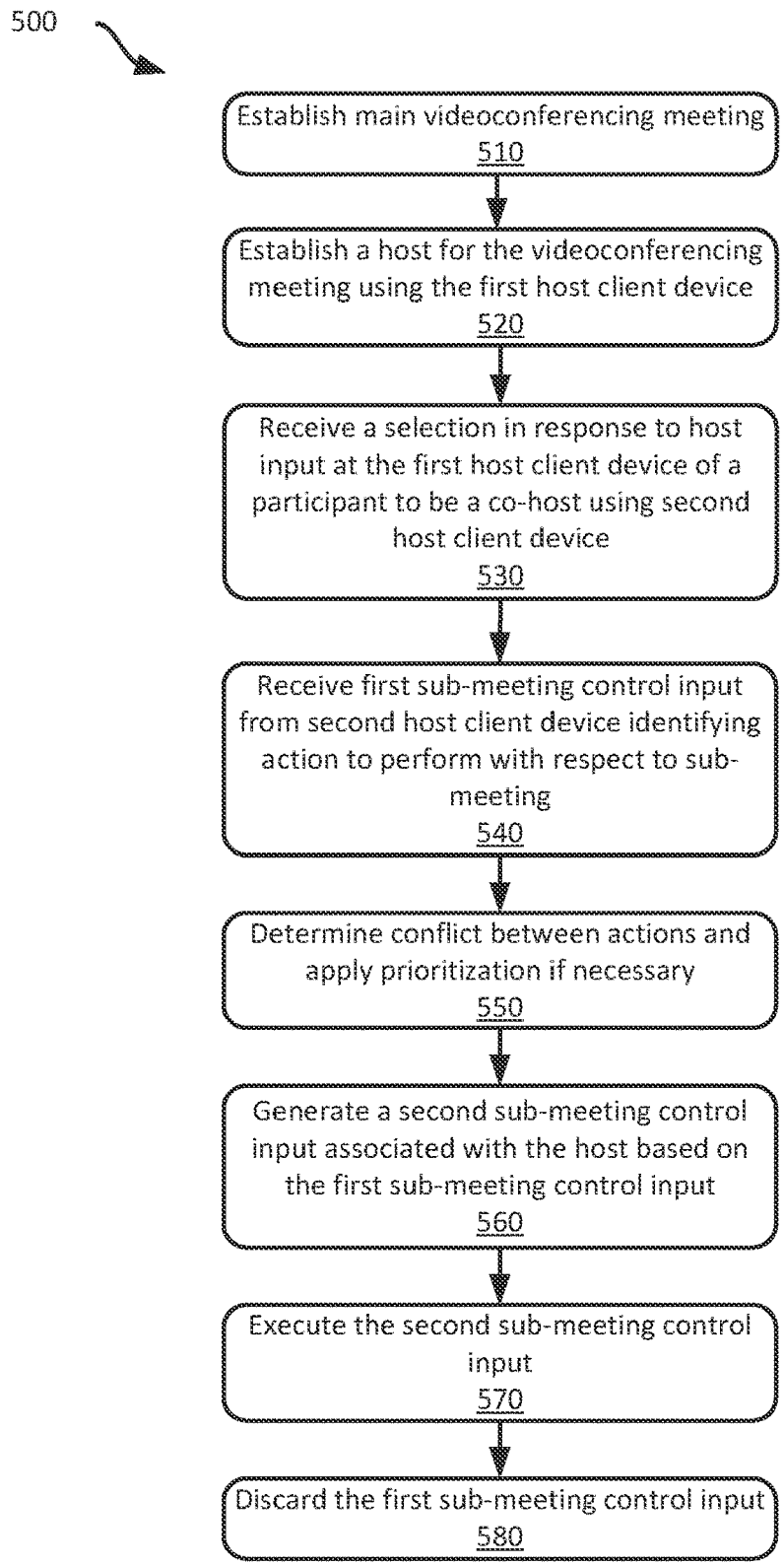
FIGS. 5-6 illustrate example methods for multiple host management of videoconferencing sub-meetings.

Referring now to FIG. 5, FIG. 5 illustrates an example method 500 for controlling sub-meetings (breakout rooms) using control input from multiple hosts. The description of the method 500 in FIG. 5 will be made with reference to the system shown in FIG. 4; however any suitable system according to this disclosure may be used, such as the example systems 100, 200, and 200 shown in FIGS. 1, 2, and 3.

At block 510, the main videoconferencing meeting is established. To establish the meeting, the meeting organizer with provide a control input through a client device to the video conference provider 310 to direct a meeting to begin. In response the video conference provider 310 will create a new meeting. Meetings will typically include a number of participants who may join once the meeting has been established.

At block 520, a host for the meeting is also established, possibly concurrently or in advance of the meeting being set up. In this example, the host uses client device 440, which accepted the control input to start the meeting. In this example, the video conference provider 310 designates the meeting organizer as the host, however, in some examples, any participant may be designated as the host by the video conference provider 310.

At block 530, video conference provider 410 receives a selection of one or more co-hosts from the main host 440. The co-hosts may be selected from among participants in the main videoconferencing meeting by the main host either during the meeting or they may be pre-selected by the main host. Once a co-host has been selected, the video conference provider 310 grants certain additional administrative privileges to the co-host, such as the privilege to move meeting participants into, out of, or between sub-meetings. In some examples, the granted privileges may include the ability to create or end sub-meetings, or any other privileges discussed above or that may be available via the video conference provider.

In this example, one co-host interacts with video conference provider 410 using client device 460, and another co-host interacts with the video conference provider 410 using client device 465. Control inputs received by video conference provider 410 from the host client device 440 are stored in a command queue 416. Commands to take actions recognized by the video conference provider generally are identified by control inputs made at client devices, such as by a user selecting an option in a graphical user interface ("GUI"). Sub-meeting control input received through client device 440 can invoke actions to manage sub-meetings, generally as discussed above.

At block 540 of FIG. 5, the video conference provider receives sub-meeting control input from a co-host, such as the co-host using client device 460. This sub-meeting control input identifies an action to perform with respect to one of sub-meetings 495a-b. For example, the co-host may have selected an option to create a new sub-meeting, e.g., sub-meeting 495a, which is transmitted to the video conference provider 410.

At block 550, the video conference provider 410 determines if there is a conflict between this action and other actions invoked by meeting control input received from other host or co-host client devices 440 or 465. In some examples, there may be no pending actions in the queue and no other pending control inputs, in which case, control input to perform the action is inserted into the queue. However, if multiple control inputs are received, it may be that some attempt to perform different actions with respect to the same participant or the same sub-meeting. In such cases, the video conference provider 410 must mediate these inputs.

To do so, in this example, the video conference provider 410 applies prioritization rules. Prioritization rules can be used to determine which sub-meeting control input is given priority when multiple inputs are received at or about the same time by the video conferencing provider. Prioritization can be based, as examples, on which is the most recent or last of the sub-meeting control inputs received, which client device provides the input, the status of a host client device, host client device activity, host client device type, or on host client device location.

For example, if control inputs are received at about the same time from both a main host and a co-host requesting that the same participant be moved to two different breakout rooms, the video conference provider must act on only one. If the stored prioritization specifies that the video conference provider should always take action based on the last input received at the video conference provider, and the provider receives input from the main host requesting that the participant be moved to breakout room A and then a millisecond later receives input from a co-host requesting that the participant be moved to breakout room B, then the participant will be moved to breakout room B. Alternatively, if the stored prioritization gives the main host priority, then these same inputs will cause the participant to be moved to breakout room A.

Video conference provider 410 in this example treats all control inputs as originating from the main host's client device 440. Thus, at block 560 of FIG. 5, video conference provider 410 generates a second sub-meeting control input associated with the main host and host client device 440. This second sub-meeting control input is based on the first sub-meeting control input to identify the same action with respect to managing the sub-meetings.

At block 570, after any conflicts have been resolved, the second sub-meeting control input is placed into command queue 416 for execution. The video conference provider 410 takes actions specified by the control inputs stored in the command queue and ultimately executes this new control input. At block 580, the first sub-meeting control input is discarded by video conference provider 410.

It should be appreciated that the example method 500 may be executed in different orders or multiple blocks may occur substantially simultaneously. For example, blocks 520 and 530 may occur before a meeting is established at block 510. Further, block 540 may occur multiple times substantially simultaneously, e.g., based on multiple control inputs received from multiple co-hosts or the host, which may lead to conflicts to be resolved at block 550. Further, because control inputs may be received asynchronously at any time from the host or co-hosts, blocks 540-580 may occur multiple times substantially simultaneously in some examples.

Figure 6:
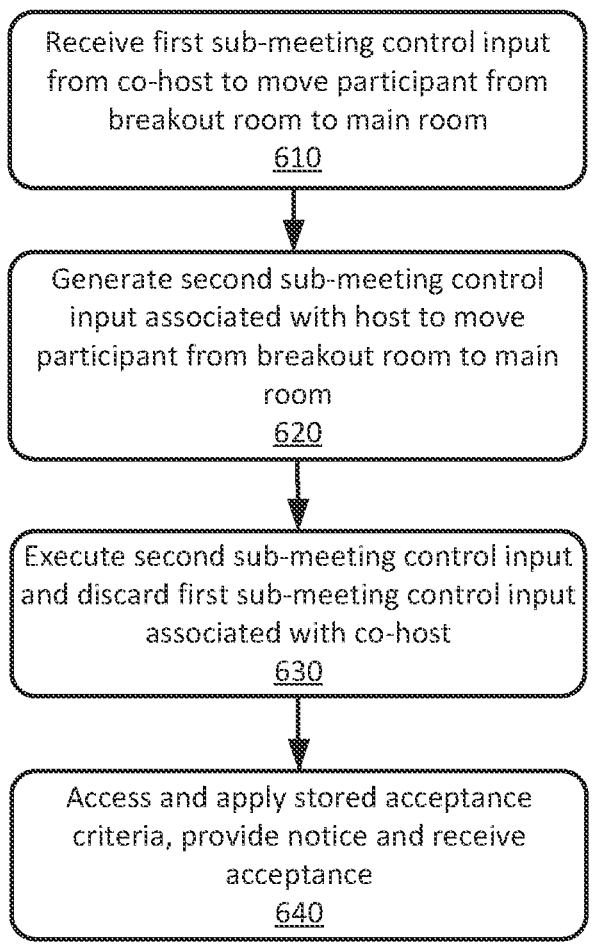

Referring now to the method 600 illustrated in FIG. 6, FIG. 6 shows an example method 600 for controlling sub-meetings (breakout rooms) using control input from multiple hosts in order to move a participant from a virtual breakout room back to a virtual main room. The description of the method 600 in FIG. 6 will be made with reference to the system 400 shown in FIG. 4; however any suitable system according to this disclosure may be used, such as the example systems 100, 200, and 300 shown in FIGS. 1, 2, and 3. The method may begin with establishing meetings and hosts as described with respect to the method of FIG. 5. These blocks are not repeated in FIG. 6.

At block 610, video conference provider 410 receives a first sub-meeting control input from a co-host to move a participant from one of the virtual breakout rooms (sub-meetings) 495*a-b* to the virtual main meeting room 490. At block 620, the video conference provider generates a second sub-meeting control input associated with the main host. This second sub-meeting control input is based on the first sub-meeting control input and thus identifies an action to move the participant from the breakout room into the main meeting room. At block 630, the first sub-meeting control input is discarded and the second sub-meeting control input is inserted into host command queue 416 and executed to move the participant into the main meeting room. At block 640, the video conference provider 410 accesses and applies stored acceptance criteria 418 to the move. In this example, the stored acceptance criteria specify that a notice is provided to the participant, and that the participant needs to indicate acceptance of an invitation in order to move back to the main meeting.

In the case of additional sub-meeting control inputs received at host client devices corresponding to additional co-hosts, the process can be similar to that described above. In each case, video conference provider 410 can generate an additional sub-meeting control input associated with the main host, store the additional input in the command queue 416, and discard the original control input.

Figure 7:
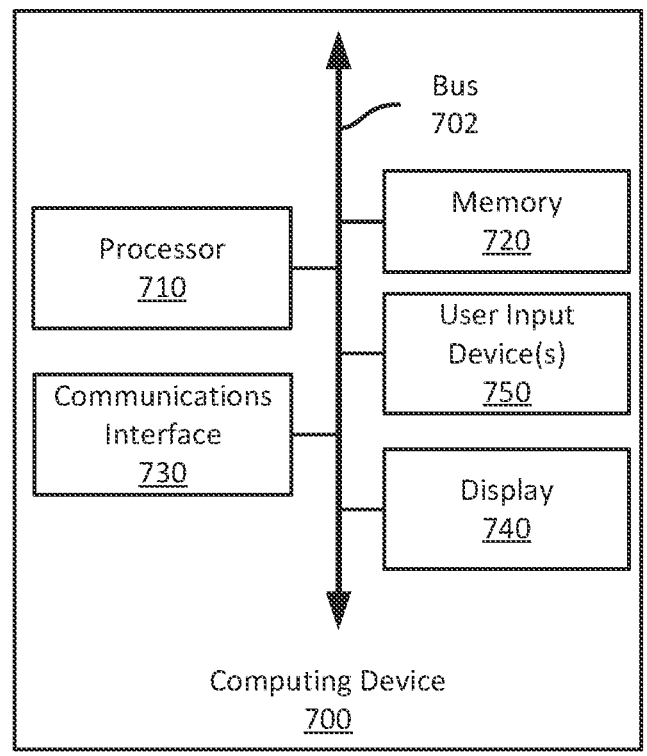
FIG. 7 shows an example computing device suitable for use with any disclosed systems or methods according to this disclosure.

Referring now to FIG. 7, FIG. 7 shows an example computing device 700 suitable for use in example systems or methods for controlling sub-meetings using control input from multiple hosts according to this disclosure. The example computing device 700 includes a processor 710 which is in communication with the memory 720 and other components of the computing device 700 using one or more communications buses 702. The processor 710 is configured to execute processor-executable instructions stored in the memory 720 to perform one or more methods for controlling sub-meetings using control input from multiple hosts according to different examples, such as part or all of the example methods 500, 600 described above with respect to FIGS. 5 and 6. The computing device, in this example, also includes one or more user input devices 750, such as a keyboard, mouse, touchscreen, video input device (e.g., one or more cameras), microphone, etc., to accept user input. The computing device 700 also includes a display 740 to provide visual output to a user.

The computing device 700 also includes a communications interface 730. In some examples, the communications interface 730 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

That which is claimed is:

1. A computer-implemented method comprising:
   establishing, by a videoconferencing system, a main videoconferencing meeting, the main videoconferencing meeting including a plurality of participants;
   establishing, by the videoconferencing system, a host and a co-host of the main videoconferencing meeting, the host participating in the main videoconferencing meeting from a first client device and the co-host participating in the main videoconferencing meeting from a second client device;
   receiving, by the videoconferencing system, a first sub-meeting control input from the second client device of the co-host to perform an action with respect to a sub-meeting associated with the main videoconferencing meeting;
   in response to receiving the first sub-meeting control input and prior to performing the action, generating, by the videoconferencing system, a second sub-meeting control input configured to perform the action, the second sub-meeting control input being automatically generated by the videoconferencing system on behalf of the host and identifying the action to be performed with respect to the sub-meeting; and
   executing, by the videoconferencing system, the second sub-meeting control input to perform the action with respect to the sub-meeting.

2. The method of claim 1, wherein the action comprises starting the sub-meeting, moving a participant into the sub-meeting, moving the participant out of the sub-meeting, or ending the sub-meeting.

3. The method of claim 1, further:
   establishing, by the videoconferencing system, a second co-host associated with the main videoconferencing meeting, the second co-host participating in the main videoconferencing meeting from a third client device;
   receiving, by the videoconferencing system, a third sub-meeting control input from the third client device, the third sub-meeting control input identifying an additional command to perform with respect to the sub-meeting associated with the main videoconferencing meeting;
   in response to receiving the third sub-meeting control input, generating, by the videoconferencing system, a fourth sub-meeting control input configured to perform the additional command, the fourth sub-meeting control input being automatically generated by the videoconferencing system on behalf of the host; and
   executing, by the videoconferencing system, the fourth sub-meeting control input and discarding the third sub-meeting control input.

4. The method of claim 1, further comprising:
   after generating the second sub-meeting control input, discarding the first sub-meeting control input.

5. The method of claim 1, further comprising:
   inserting, by the videoconferencing system, the second sub-meeting control input into a host command queue associated with the host of the main videoconferencing meeting; and
   executing, by the videoconferencing system, the second sub-meeting control input from the host command queue as if the action originated from the host.

6. The method of claim 1, wherein the action comprises moving a participant from the sub-meeting to the main videoconferencing meeting.

7. The method of claim 6, further comprising:
transmitting, by the videoconferencing system, a notification of the action to the participant; and
receiving, by the videoconferencing system, an acceptance of the action from the participant.

8. A system comprising:
a processor; and
at least one memory device including instructions that are executable by the processor to cause the processor to:
establish a main videoconferencing meeting, the main videoconferencing meeting including a plurality of participants;
establish a host and a co-host of the main videoconferencing meeting, the host participating in the main videoconferencing meeting from a first client device and the co-host participating in the main videoconferencing meeting from a second client device;
receive a first sub-meeting control input from the second client device of the co-host to perform an action with respect to a sub-meeting associated with the main videoconferencing meeting;
in response to receiving the first sub-meeting control input and prior to performing the action, generate a second sub-meeting control input to perform the action, the second sub-meeting control input being automatically generated by the system on behalf of the host and identifying the action to be performed with respect to the sub-meeting; and
execute the second sub-meeting control input to perform the action with respect to the sub-meeting.

9. The system of claim 8, wherein the action comprises starting the sub-meeting, moving a participant into the sub-meeting, moving the participant out of the sub-meeting, or ending the sub-meeting.

10. The system of claim 8, wherein the instructions are executable by the processor to cause the processor to:
establish a second co-host associated with the main videoconferencing meeting, the second co-host participating in the main videoconferencing meeting from a third client device;
receive a third sub-meeting control input from the third client device, the third sub-meeting control input identifying an additional command to perform with respect to the sub-meeting associated with the main videoconferencing meeting;
in response to receiving the third sub-meeting control input, generate a fourth sub-meeting control input configured to perform the additional command, the fourth sub-meeting control input being automatically generated by the system on behalf of the host; and
execute the fourth sub-meeting control input and discard the third sub-meeting control input.

11. The system of claim 8, wherein the instructions are executable by the processor to cause the processor to:
after generating the second sub-meeting control input, discard the first sub-meeting control input.

12. The system of claim 8, wherein the instructions are executable by the processor to cause the processor to:
insert the second sub-meeting control input into a host command queue associated with the host of the main videoconferencing meeting; and
execute the second sub-meeting control input from the host command queue as if the action originated from the host.

13. The system of claim 8, wherein the first client device and the second client device are configured to transmit a request to move a participant from the sub-meeting to the main videoconferencing meeting.

14. The system of claim 13, further comprising a network services server configured to transmit a notification of the request to and receive an acceptance of the request from the participant.

15. A non-transitory computer-readable medium comprising code that is executable by a processor for causing the processor to:
establish a main videoconferencing meeting, the main videoconferencing meeting including a plurality of participants;
establish a host and a co-host of the main videoconferencing meeting, the host participating in the main videoconferencing meeting from a first client device and the co-host participating in the main videoconferencing meeting from a second client device;
receive a first sub-meeting control input from the second client device of the co-host to perform an action with respect to a sub-meeting associated with the main videoconferencing meeting;
in response to receiving the first sub-meeting control input and prior to performing the action, generate a second sub-meeting control input configured to perform the action, the second sub-meeting control input being automatically generated on behalf of the host and identifying the action to be performed with respect to the sub-meeting; and
execute the second sub-meeting control input to perform the action with respect to the sub-meeting.

16. The non-transitory computer-readable medium of claim 15, wherein the action comprises starting the sub-meeting, moving a participant into the sub-meeting, moving the participant out of the sub-meeting, or ending the sub-meeting.

17. The non-transitory computer-readable medium of claim 15, wherein the code is executable by the processor to cause the processor to:
establish a second co-host associated with the main videoconferencing meeting, the second co-host participating in the main videoconferencing meeting from a third client device;
receive a third sub-meeting control input from the third client device, the third sub-meeting control input identifying an additional command to perform with respect to the sub-meeting associated with the main videoconferencing meeting;
in response to receiving the third sub-meeting control input, generate a fourth sub-meeting control input configured to perform the additional command; and
execute the fourth sub-meeting control input and discard the third sub-meeting control input.

18. The non-transitory computer-readable medium of claim 17, wherein the code is executable by the processor to cause the processor to:
after generating the second sub-meeting control input, discard the first sub-meeting control input.

19. The non-transitory computer-readable medium of claim 18, wherein the code is executable by the processor to cause the processor to:
insert the second sub-meeting control input into a host command queue associated with the host of the main videoconferencing meeting; and
execute the second sub-meeting control input from the host command queue.

20. The non-transitory computer-readable medium of claim 15, wherein the action comprises moving a participant from the sub-meeting to the main videoconferencing meeting, and wherein the code is executable by the processor to cause the processor to:
  transmit a notification of the action to the participant; and
  receive an acceptance of the action from the participant.

* * * * *